Sept. 6, 1966  R. F. HAZELTON  3,271,116
APPARATUS FOR CONTINUOUS PYROLYSIS OF LIQUID MATERIALS
Filed Jan. 8, 1964  3 Sheets-Sheet 3

INVENTOR.
RUSSELL F. HAZELTON
BY
Thomas C. Doyle
AGENT

United States Patent Office 3,271,116
Patented Sept. 6, 1966

3,271,116
APPARATUS FOR CONTINUOUS PYROLYSIS OF LIQUID MATERIALS
Russell Frank Hazelton, Chester, Va., assignor to Allied Chemical Corporation, New York, N.Y., a corporation of New York
Original application Mar. 6, 1962, Ser. No. 177,919. Divided and this application Jan. 8, 1964, Ser. No. 336,521
12 Claims. (Cl. 23—284)

This application is a division of copending U.S. application, Serial Number 177,919, filed March 6, 1962 and now abandoned. The apparatus described and claimed herein may be used in conjunction with any and all of the procedures set forth in said copending application.

This invention relates to an improved reaction apparatus and more particularly to an apparatus for the continuous conversion of urea to other products, especially melamine.

It is known to produce melamine by pyrolysis of urea, and many suggestions have been made for industrial processes based on this reaction. However, various difficulties have been encountered in commercially exploiting these and other processes where the severe corrosive effect of the heated reaction materials at the elevated pressures required to make the processes practical in terms of yield is a major problem.

Corrosion resistant metals such as titanium have been suggested for reactor construction, but it has been found that these metals begin to lose their strength at elevated reaction temperatures. Consequently, while overcoming the problem of corrosion the use of these metals has introduced structural difficulties in the designing of a suitable reactor for commercial scale operations. Among the prior art inventions which point up these difficulties are U.S.P. 2,927,923 and British Patent 639,962 which describe tubular urea reactors. In such reactors urea is first converted to various intermediates, including infusibles, and melamine is formed from such intermediate products. To prevent plugging of the tubes with infusibles it is necessary to operate at higher pressures than is desirable using the preferred corrosion resistant metals.

Also, it has been found that operation of a tubular reactor without plugging is possible only where the reactor contains a single tube. Attempts to use multiple tubes in parallel (necessary for high capacity required in industrial practice) result in alternate plugging and unplugging of tubes; the unplugged tubes carry feed at excessive rates while the plugged tubes may overheat.

"Pot-type" reactors such as that described in U.S.P. 2,776,284, while overcoming some of the deficiencies of the tubular reactors, require a complex external heating arrangement which is difficult to design from corrosion resistant metals having decreased strength at reaction temperatures. In addition the piping and tubing necessarily associated with such a heating arrangement as described in this patent would provide possible points of plugging if designed so as to give the high surface-to-volume ratio used in conventional heat exchanger construction. On the other hand if the tubing is made large enough to substantially eliminate the possibility of plugging, heat transfer efficiency is sacrificed by the necessarily thicker walls.

It is an object of this invention to provide a reaction apparatus of relatively simple construction.

It is a further object of this invention to provide an apparatus which is eminently suited for the production of melamine from urea on a commercial scale.

It is a still further object of this invention to provide an apparatus for melamine production which substantially eliminates the problems of plugging, corrosion, heat loss, poor heat transfer and structural weakening usually attendant with prior art reactors.

These and other objects are achieved in general by incorporating in a vertical cylindrical shell a series of solid-core bayonet electrical heating elements sheathed in corrosion resistant metal and so arranged within said shell as to provide a thermal differential whereby material within said shell is caused to circulate upwardly in one portion and downwardly in an adjacent portion of said shell.

A further understanding of the nature and objects of the invention will be had from the following description taken in connection with the accompanying drawings of which:

Figure 1:
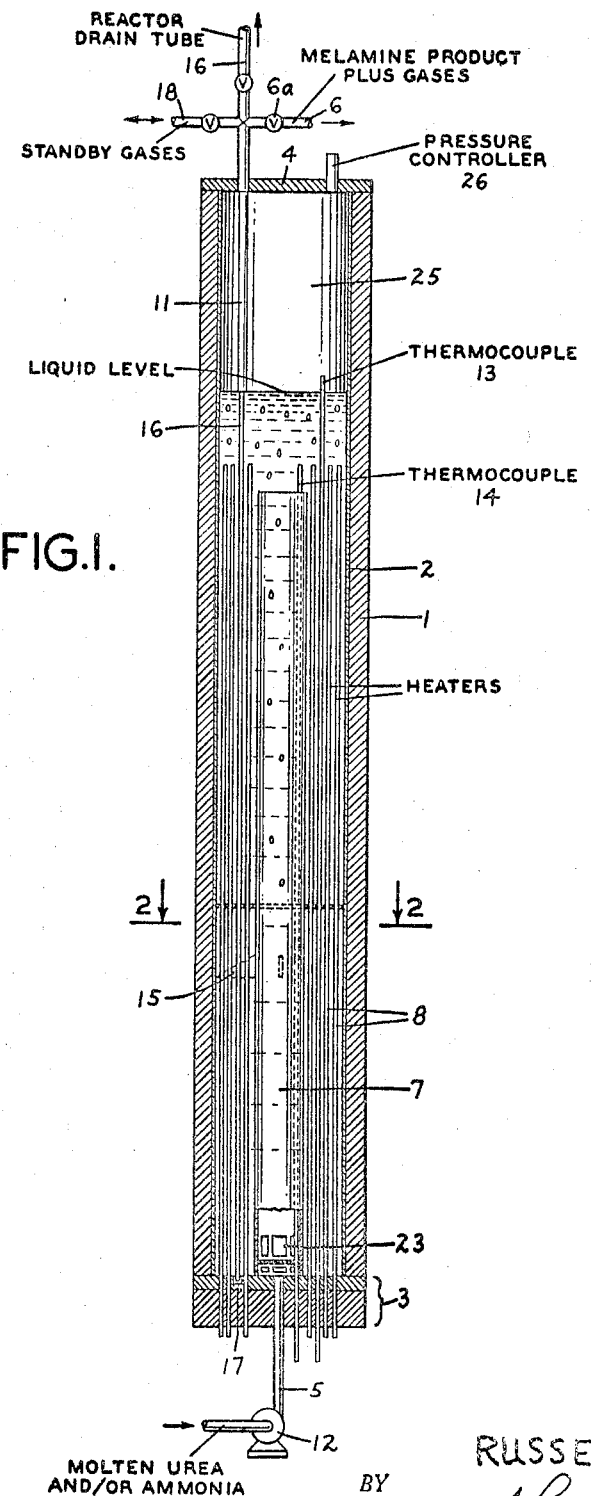
FIGURE 1 is a reactor embodying the invention shown in vertical section.

Referring to the drawings the apparatus comprises an upright vertical cylindrical reaction vessel 1 lined with a corrosion resistant metal 2, for instance, titanium or zirconium, with high pressure end closures 3, 4 having feed inlet line 5 at the bottom and product exit 6 at the top. A draft tube 7 of corrosion resistant metal for circulation of liquid is provided immediately above the feed inlet and is internally attached to bottom closure 3. Bayonet type electrical heaters 8 with corrosion resistant, for example, titanium sheathing extend from the bottom closure upward through the annular space 9 between the draft tube and the reactor walls. For withdrawal of product and reaction gases, a dip tube 11 connected to the top closure 4 extends downward only a fraction of the total height of the reaction vessel and terminates above the upper end of draft tube 7. Molten or liquid feed enters feed tube 5 via pump 12. Surfaces within the reactor are of corrosion resistant material.

Figure 2:
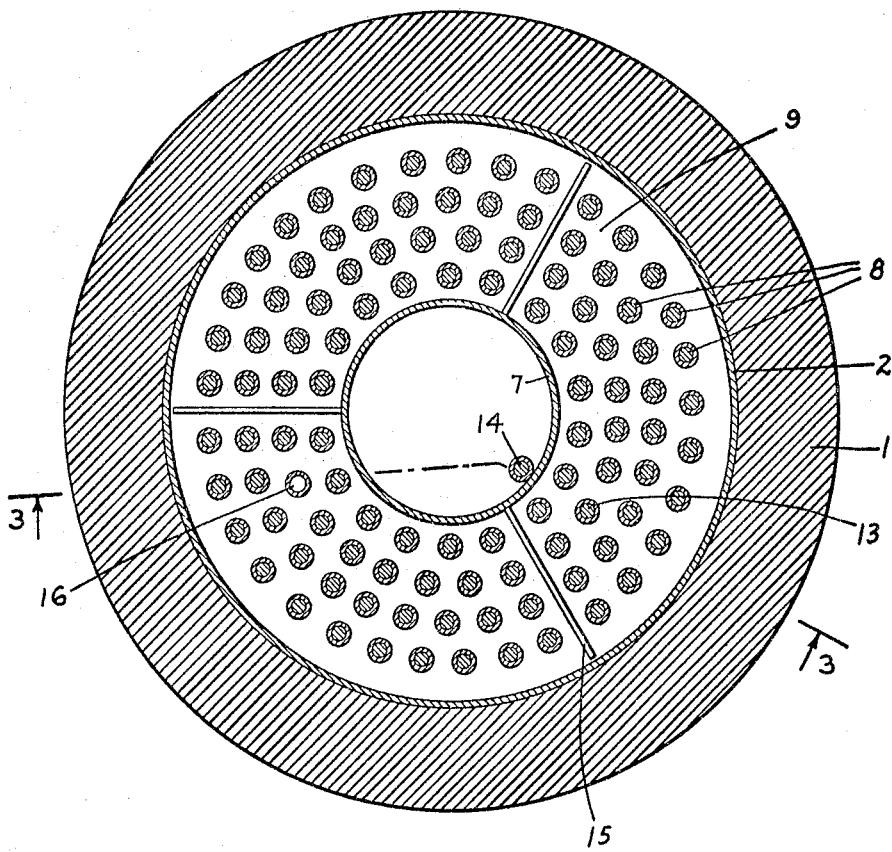
FIGURE 2 is a cross sectional view taken along the line 2—2 of FIGURE 1.

FIG. 2 shows the arrangement of the heaters 8, draft tube 7, thermocouples 13, 14 and one of several similar spacing brackets 15 for the draft tube. The brackets are welded to the draft tube, with outer extremities in close proximity to but not welded to the inner wall of the reactor cylinder. This permits easier removal of the draft tube for maintenance and repair.

Figure 3:
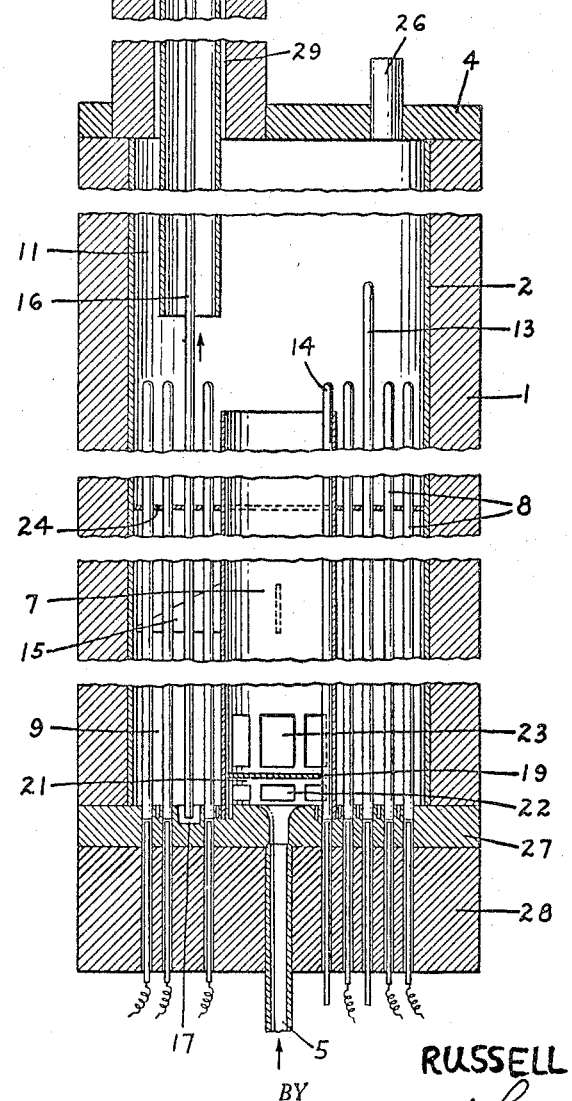
FIGURE 3 is an enlarged sectional view of the discharge parts, middle and lower portions taken along the line 3—3 of FIGURE 2.

FIG. 3 shows enlarged details of the upper and lower sections of the reactor. Flanges and bolts for assembly of the unit are not shown. Dip tube 16 concentrically within the product exit dip tube 11 extends through the top closure of the shell to a well 17 in the bottom closure allows complete draining of the reactor contents when desired, for example, at the end of a run. A letdown or pressure reducing valve 6a is provided on exit 6 to control withdrawal of liquids and gases from the reactor. Valve 18v on line 18 permits input or discharge of gases as needed in stand-by conditions such as power failures or other disruptions. These gases pass through annulus 29.

With further reference to FIG. 3, a horizontal disc 19 divides tube 7 to provide a lower baffle section 21 extending a few inches from the bottom closure 3. Rectangular ports 22 allow material entering this baffle section via pump 12 and line 5 to pass into annular space 9. The upper section of tube 7 is provided with larger ports 23 just above the dividing disc 19.

Brackets 24 secure the heaters 8 in spaced relation in the reactor. These brackets are arranged to provide a minimum of interference with flow of liquid up through the annular passage 9. Dip tube 11 projecting into the shell for withdrawal of reaction products provides a gas buffer volume 25. Control 26 by actuating letdown valve 6a maintains substantially constant pressure within the reactor. Tube sheet 27, of corrosion resistant material is supported by steel back-up flange 28, and together they form bottom closure 3.

Reactor insulation, rupture discs, electrical heating for the inlet and exit lines, level indicators and other accessories conventionally associated with high temperature, high pressure reactors are not shown in the figures. Heaters 8 are sealed into corrosion resistant tube sheet 27 by welding or brazing. Feed inlet tube 5 is fastened to the tube sheet 27 by conventional means such as studs and flanges or by welding.

In accordance with one process utilizing the apparatus of this invention molten urea enters the reactor via pump 12 and bottom feed line 5 and is directed through lower baffle section 21 and ports 22 into annulus 9 formed by the wall of the reactor and vertical draft tube 7. The urea distributes itself around the annular space 9 and disperses into a circulating mass of hot molten material which is chiefly melamine already produced. On absorption of heat from the hot material, the urea pyrolizes to melamine. The gases released in the reaction, assisted by thermal lift, provide the driving force necessary to maintain circulation of the molten reactants. If it becomes necessary to interrupt the urea feed, circulation may be maintained by admitting ammonia gas via inlet 5. This ammonia gas exits via line 18 which is also connected to an ammonia source (not shown) which may be used to prevent clogging of annulus 29. Liquid flow is upward through the annular space containing the heaters and downward through the draft tube 7. Liquid reaction mixture leaving the bottom ports 23 of the draft tube is circulated by the gas lift effect of the ammonia and carbon dioxide produced in the reaction, aided by thermal effects. The molten and gaseous products formed in the pyrolysis of urea are discharged from the reactants through exit 6 by way of top entering dip tube 11. The reaction temperature is maintained at about 350–470° C. by a temperature control (not shown) and the pressure is maintained at 1000–4000 p.s.i.g.

In starting up, the reactor may be charged in any suitable manner with molten melamine or a molten mixture of melamine, ammonia, and carbon dioxide under operating pressure.

As molten urea is heated above 350° C., it passes through various infusible intermediate stages in its conversion to melamine. These intermediates cause plugging and corrosion which have been a source of much difficulty in the prior art attempts to convert urea to melamine. Plugging and excessive corrosion are avoided in the present invention in the following manner:

As molten urea is fed into the reactor the reactant is distributed in liquid reaction product mixture comprising melamine, ammonia and carbon dioxide (which is relatively non-corrosive) in the annulus between the draft tube and the wall of the reactor. The annular space contains the electrical heating elements which supply the heat required for rapid pyrolysis of urea to melamine. The urea is dispersed evenly into the mass of circulating liquid melamine and is converted into melamine on absorption of heat. Thus the novel construction of this apparatus avoids high local concentrations of insoluble or corrosive intermediates.

I claim:

1. An apparatus which comprises a vertically elongated pressure resistant reaction vessel having a top closure and a bottom closure, a series of vertical bayonet-type electrical heaters extending a major portion of the height of said vessel so disposed within said vessel as to provide a heated zone and a laterally adjacent unheated zone, means for introducing liquid feed to the bottom portion of said vessel and distributing it about said heaters, and a dip tube extending vertically downward from said top closure a fraction of the total height of said vessel for continuously removing liquid reaction product and by-products from the upper portion of said vessel and maintaining a substantial gas buffer volume between liquid material in said vessel and said top closure, and a vertical draft tube coaxially aligned within said vessel and extending from the lower portion of said vessel upward to a point lower than the lower end of said dip tube.

2. An apparatus which comprises a vertical, cylindrical, pressure resistant reaction vessel having a top closure and a bottom closure, a series of vertical bayonet-type electrical heaters so disposed within said vessel as to provide a heated zone around a laterally adjacent unheated zone, means for introducing liquid feed to the bottom portion of said vessel, a dip tube extending vertically downward from said top closure a fraction of the total height of said vessel for continuously removing liquid reaction product and by-products from the upper portion of the said vessel and maintaining a substantial gas buffer volume between said liquid material in said vessel and said top closure, a vertical draft tube coaxially aligned within said vessel and extending from said bottom closure above said feed means upward to a point below the lower end of said dip tube, a horizontal partition within the lower portion of said draft tube and vents in said draft tube above and below said partition for directing liquid from said draft tube and feed means toward the base of said heaters, and means for introducing gas to and removing gas from said gas buffer volume.

3. The apparatus of claim 2 wherein all surfaces within the reaction vessel are of corrosion resistant metal.

4. The apparatus of claim 2 which also contains means, associated with said product removal dip tube, for emptying the reaction vessel.

5. The apparatus of claim 4 wherein the product removal means, reactor emptying means and gas introduction and removal means are associated with the top closure of the vessel.

6. The apparatus of claim 1 wherein the reaction vessel is a cylinder.

7. The apparatus of claim 6 wherein the liquid introducing means is located in the bottom closure.

8. The apparatus of claim 7 wherein the draft tube extends a major portion of the height of the reaction vessel.

9. The apparatus of claim 8 wherein the heaters, a draft tube and the inner walls of the vessel are surfaced with corrosion resistant metal.

10. An apparatus which comprises a vertical, cylindrical, pressure resistant reaction vessel having a top closure and a bottom closure, a series of vertical bayonet type electrical heaters so disposed within said vessel as to provide a heated zone around a laterally adjacent unheated zone, means for introducing liquid feed to the bottom portion of said vessel, a dip tube extending vertically downward from said top closure a fraction of the total height of said vessel for continuously removing liquid reaction product and by-products from the upper portion of said vessel and maintaining a substantial gas buffer volume between liquid material in said vessel and said top closure, a vertical draft tube coaxially aligned within said vessel, surrounded by said heaters and extending from said bottom closure at a point immediately above said feed means upward to a point below the lower end of said dip tube and a horizontal partition between said liquid feed means and said draft tube for directing incoming feed to the heated portion of said reaction vessel via vent means below said horizontal partition.

11. The apparatus of claim 10 wherein all surfaces coming in contact with the reactant or reaction mixture are of corrosion resistant metal.

12. The apparatus of claim 11 which also contains a thermocouple and brackets associated with the heaters wherein the partition member, heating rods, thermocouple and associated brackets may be removed as a unit with the bottom tube sheet through the lower end of the reaction vessel.

References Cited by the Examiner

UNITED STATES PATENTS

| | | |
|---|---|---|
| 2,518,270 | 8/1950 | Barr. |
| 3,066,214 | 11/1962 | Arnold _____ 219—314 |
| 3,153,084 | 10/1964 | Veazey et al. _____ 23—252 X |

MORRIS O. WOLK, *Primary Examiner.*

JAMES H. TAYMAN, Jr., *Examiner.*